June 19, 1928.

G. A. BURANDT 1,674,031

BUMPERETTE

Filed Sept. 6, 1927

Witness
L. F. Sundberg

Inventor
Gustav A. Burandt
by Bair & Freeman Attorneys

Patented June 19, 1928.

1,674,031

UNITED STATES PATENT OFFICE.

GUSTAV A. BURANDT, OF ST. PAUL, MINNESOTA, ASSIGNOR TO MARQUETTE MANUFACTURING COMPANY, OF ST. PAUL, MINNESOTA.

BUMPERETTE.

Application filed September 6, 1927. Serial No. 217,709.

The object of my invention is to provide a bumperette or fender guard for the rear mud guards of an automobile which is simple, durable, inexpensive and easily installed upon the transverse frame of the automobile.

More particularly my invention relates to a pair of spaced bumper elements supported upon the automobile frame by a pair of spring bars each of which is curved so that when the outer end of the bumper element is subjected to an impact or blow the bumper elements themselves will yield or move without destruction to the supporting bars.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figures 1, 2, 3, 4:
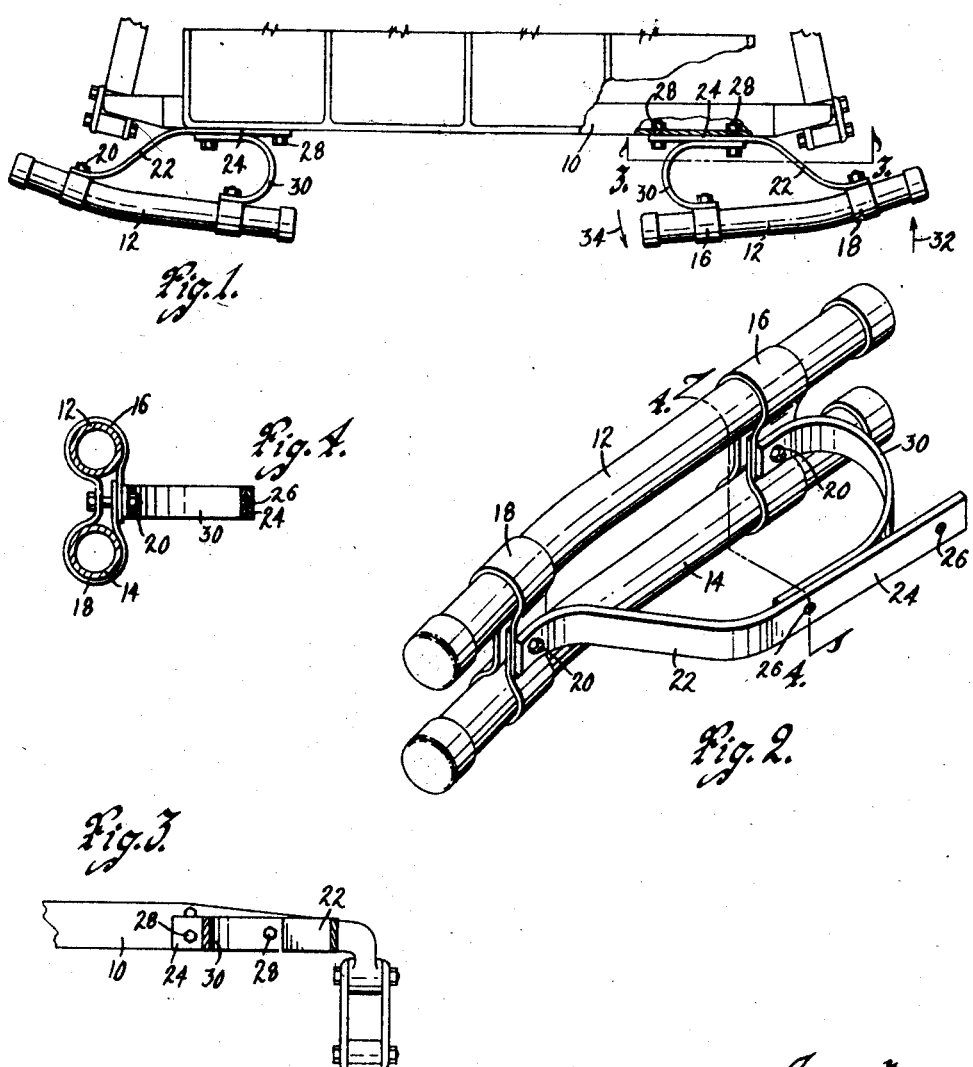
Figure 1 is a top plan view of the rear transverse frame member of an automobile with a pair of my bumperettes installed thereon.
Figure 2 is a perspective view of one of the bumperettes.
Figure 3 is a detail sectional view taken on the line 3—3 of Figure 1.
Figure 4 is a sectional view taken on the line 4—4 of Figure 2.

In the accompanying drawings I have used the reference numeral 10 to indicate generally the rear transverse frame member of an automobile. The frame member as illustrated, is preferably of channel construction.

As illustrated in the drawings, my bumperette is adapted for installation upon the Essex automobile although it may be secured upon any rear transverse frame member of an automobile.

My bumperette includes a pair of spaced tubular bumper elements 12 and 14. The bumper elements 12 and 14 are connected together and held in spaced apart relationship by a pair of clamp members 16 and 18. Each clamp member is formed of a single piece of strap iron material formed to provide a pair of receiving loops for the bumper elements 12 and 14 and the intermediate portion between the two loops receives a bolt or the like 20 for clamping the loops around the bumper elements 12 and 14.

Secured to the bolt 20 of the clamp member 18 is a spring bar support 22 having a curved portion. The spring bar support 22 projects forwardly and inwardly from the clamp member 18 to which it is fixed at one end.

The bar 22 terminates in a straight portion 24 having a pair of openings 26. The straight portion 24 is adapted to rest against the frame member 10 as clearly illustrated in Figure 1 of the drawings. Bolts or the like 28 project through the openings 26 and through openings formed in the frame 10 whereby the support 22 may be connected to the frame 10.

A U-shaped spring bar connection 30 is connected at one end to the clamp member 16 by means of the bolt 20 and at its other end it is connected to the bar 22 through one of the bolts 28.

It will be noted that the spring bar 30 is curved from end to end and retains the inner ends of the bumper elements in spaced position from the inner end of the supporting bar 22. The fact that both of the supporting bars 22 and 30 are curved, obtains a very desirable object.

In the event that the outer ends of the bumper elements receive an impact or blow in the direction indicated by the arrow 32, it will tend to swing or pivot the bumper elements upon the curved portion of the bar 22 while the inner ends of the bumpers will tend to move in the direction indicated by the arrow 34 against the action of the spring bar 30.

It may be here mentioned that the curved portion of the bar 22 tends to allow for such swinging or pivotal movement of the bumper elements while the U-shaped spring bar 30 tends to resist this movement although, in case of a severe impact, it allows for such movement and tends to return the bumper elements to their normal position.

Both of the supports 22 and 30 serve to position the bumper elements rearwardly from the frame 10 and at the same time allow for a connection of the bumper elements with the frame 10.

My bumperette when installed on an automobile has a very neat appearance.

Some changes may be made in the construction, and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A bumperette comprising a pair of spaced tubular bumper elements, a pair of spaced clamp members for said bumper elements, a spring bar support fixed to one of said clamp members and extending forwardly and inwardly therefrom, said support having a straight portion for engagement with the transverse frame member of an automobile and a brace bar of substantially U-shape secured at one end to the other of said clamp members and at its other end to said bar support at a point spaced from the ends thereof.

2. A bumperette comprising a pair of spaced tubular bumper elements, a pair of spaced clamp members for said bumper elements, a spring bar support fixed to one of said clamp members and extending forwardly and inwardly therefrom, said support having a straight portion for engagement with the transverse frame member of an automobile and spaced forwardly from the other of said clamp members and spring means of connection between said last clamp member and said straight portion.

3. A bumperette comprising a pair of spaced tubular bumper elements, a pair of spaced clamp members for said bumper elements, a spring bar support fixed to one of said clamp members and extending forwardly and inwardly therefrom, said support having a straight portion for engagement with the transverse frame member of an automobile and spaced forwardly from the other of said clamp members and a U-shaped connection between said last clamp member and said straight portion.

4. A bumperette comprising a pair of spaced tubular bumper elements, a pair of spaced clamp members for said bumper elements, a spring bar support fixed to one of said clamp members and extending forwardly and inwardly therefrom, said support having a straight portion for engagement with the transverse frame member of an automobile and spaced forwardly from the other of said clamp members and a U-shaped connection between said last clamp member and said straight portion, a pair of bolts for connecting said straight portion to the automobile frame, one of said bolts serving to connect said U-shaped connection to said straight portion.

5. A bumperette comprising a pair of vertically spaced bumper elements, spaced clamp members for holding said elements in spaced relation, a spring bar connected to one of said clamp members, said bar extending forwardly therefrom and towards the other of said clamp members whereby the free end of said bar is spaced forwardly from said last mentioned clamp member and a second spring bar secured at one end to said last clamp member and at its other end to said first bar, said second spring bar being curved from end to end.

6. A bumper comprising a pair of vertically spaced bumper elements, spaced clamp members for holding said elements in spaced relation, a spring bar connected to one of said clamp members, said bar extending forwardly therefrom and towards the other of said clamp members whereby the free end of said bar is spaced forwardly from said last mentioned clamp member and a second spring bar secured at one end to said last mentioned clamp member and at its other end to said first bar, said second spring bar being curved from end to end for allowing the bumper elements in case of an impact upon their outer ends to yield without damage to said first and second bars.

7. A bumper comprising a pair of vertically spaced bumper elements, spaced clamp members for holding said elements in spaced relation, a spring bar connected to one of said clamp members, said bar extending forwardly therefrom and towards the other of said clamp members whereby the free end of said bar is spaced forwardly from said last mentioned clamp member, means for connecting said bar to an automobile frame at two spaced points and a second spring bar secured at one end to said last mentioned clamp member and at its other end to said first bar, said second spring bar being curved from end to end.

Des Moines, Iowa, August 17, 1927.

GUSTAV A. BURANDT.